United States Patent
Fan et al.

(10) Patent No.: US 8,949,710 B2
(45) Date of Patent: Feb. 3, 2015

(54) GRAMMAR AND METHOD FOR INTEGRATING XML DATA FROM MULTIPLE SOURCES

(75) Inventors: Wenfei Fan, Somerset, NJ (US); Minos N. Garofalakis, Morristown, NJ (US); Ming Xiong, Bridgewater, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1493 days.

(21) Appl. No.: 11/179,427

(22) Filed: Jul. 12, 2005

(65) Prior Publication Data
US 2007/0016851 A1    Jan. 18, 2007

(51) Int. Cl.
G06F 17/00    (2006.01)
G06F 17/20    (2006.01)
G06F 17/21    (2006.01)
G06F 17/22    (2006.01)
G06F 17/24    (2006.01)
G06F 17/25    (2006.01)
G06F 17/26    (2006.01)
G06F 17/27    (2006.01)
G06F 17/28    (2006.01)
G06F 17/30    (2006.01)

(52) U.S. Cl.
CPC ........ G06F 17/2247 (2013.01); G06F 17/2229 (2013.01); G06F 17/2725 (2013.01); G06F 17/30926 (2013.01); G06F 17/30935 (2013.01); G06F 17/30938 (2013.01)
USPC .......................................... 715/239; 715/234

(58) Field of Classification Search
USPC ......................... 715/513, 760, 234, 236, 239
See application file for complete search history.

(56) References Cited

U.S. PATENT DOCUMENTS

| 5,438,512 | A | * | 8/1995 | Mantha et al. ................ 715/234 |
| 5,487,147 | A | * | 1/1996 | Brisson ............................ 714/1 |
| 5,491,628 | A | * | 2/1996 | Wakayama et al. .............. 704/9 |
| 6,687,404 | B1 | * | 2/2004 | Hull et al. ..................... 382/226 |

(Continued)

OTHER PUBLICATIONS

Michael Benedikt, Chee-Yong Chan, Wenfei Fan, Juliana Freire, Rajeev Rastogi, Capturing both types and constraints in data integration, Proceedings of the 2003 ACM SIGMOD international conference on Management of data, Jun. 9-12, 2003, San Diego, California.*

(Continued)

*Primary Examiner* — Stephen Alvesteffer
(74) *Attorney, Agent, or Firm* — Wall & Tong, LLP

(57) ABSTRACT

A grammar for mapping a first grouping of XML data into a second grouping of XML data and a method for accomplishing same to incorporate the first grouping into the second grouping. The grammar includes a first rule for computing a first child element attribute and a second rule for computing a second parent element attribute. The first rule and second rule vary according to a production of an element type of the first grouping. The element types include PCDATA, disjunctive, conjunctive and Kleene star, each having a unique rule set for defining inherited and synthesized attributes of the parent and child elements. The method includes the step of executing a mapping of a first grouping having at least one parent element and a set of corresponding child elements into a second grouping in accordance with the grammar rules based on the production of the element type.

20 Claims, 3 Drawing Sheets

XIG: $V_{dealer}$ (U) defining dealer views

(56) References Cited

U.S. PATENT DOCUMENTS

| | | | |
|---|---|---|---|
| 6,829,745 B2* | 12/2004 | Yassin et al. | 715/513 |
| 7,062,708 B2* | 6/2006 | Mani et al. | 715/513 |
| 7,603,654 B2* | 10/2009 | Kharitidi et al. | 717/106 |
| 2002/0152297 A1* | 10/2002 | Lebourg et al. | 709/223 |
| 2003/0093755 A1* | 5/2003 | O'Carroll | 715/500 |
| 2003/0167445 A1* | 9/2003 | Su et al. | 715/513 |
| 2004/0060004 A1* | 3/2004 | Mani et al. | 715/513 |
| 2005/0210375 A1* | 9/2005 | Iwasaki | 715/513 |
| 2005/0278368 A1* | 12/2005 | Benedikt et al. | 707/101 |
| 2006/0101073 A1* | 5/2006 | Popa et al. | 707/104.1 |
| 2006/0271506 A1* | 11/2006 | Bohannon et al. | 707/2 |

OTHER PUBLICATIONS

Fan, W., Garofalakis, M., Xiong, M., and Jia, X. 2004. Composable XML integration grammars. In Proceedings of the Thirteenth ACM international Conference on information and Knowledge Management (Washington, D.C., USA, Nov. 8-13, 2004). CIKM '04. ACM Press, New York, NY, 2-11. Retrieved online <http://doi.acm.org/10.1145/1031171.1031176>.*

Jia, Xibei. Composable XML Integration Grammars. Informatics Jamboree 2004. May 20, 2004. Retrieved online on Jun. 7, 2007 <www.inf.ed.ac.uk/events/jamboree/2004/xibei_ja.pdf>.*

D. Chamberlin et al, "XQuery 1.0: An XML Query Language," W3C Working Draft, Jun. 2001.

* cited by examiner

EXAMPLE: CAR SALE AND CAR DEALERS

EXAMPLE: XML INTEGRATION

```
XIG: V_dealer (U)
dealer ──▶ name, address, cars
   Inh(name)    = {U/dealer/name};   Inh(address)  = {U/dealer/addr};   Inh(cars)  = {U/dealer/cars};
   Syn (dealer)  = <dealer> {Syn (name)} {Syn (address)} {Syn (cars)} </dealer>
cars ──▶ car*
   Inh(car)     ── for $c in Inh (cars) / car return $c;
   Syn (cars)   = <cars> {Ll Syn (car)} </cars>
car ──▶ make, model, price, inStock
   Inh(make)    = {Inh (car) / make } ;         Inh(model)    = {Inh (car) / model } ;
   Inh(price)   = {Inh (car) / invoice/price } ;   Inh (inStock) = {Inh (car) } ;
   Syn(car)     = <car> {Syn(make)} {Syn(model)} {Syn (price)} {Syn (inStock)} </car>
inStock ──▶ (yes + no)
   Inh(yes)     = { if Inh (inStock) [ invoice / quantity / value ( ) < 1]  then <empty / > else < yes / > }
   Inh(no)      = { if Inh (inStock) [ invoice / quantity / value ( ) < 1]  then <no / > else < empty / > }
   Syn (inStock) = { if Inh (inStock) [ invoice / quantity / value ( ) < 1]  then Syn (no) else Syn (yes) }
yes ──▶ ϵ
   Syn (yes)    = Inh (yes)   /* similarly for  no */
name ──▶ PCDATA
   Syn (name)   = <name> { Inh (name) / value ( )} </name>   /* similarly for  address, make, model, price  */
```

FIG. 3  XIG: $V_{dealer}$ (U) defining dealer views

GRAMMAR AND METHOD FOR INTEGRATING XML DATA FROM MULTIPLE SOURCES

FIELD OF THE INVENTION

This invention relates to the processing of XML data and, more particularly, to the integration of XML data from one or more sources into a single XML document.

DESCRIPTION OF THE BACKGROUND ART eXtensible Markup Language (XML) is rapidly emerging as the standard for data representation and exchange on the World Wide Web. The diversity of next-generation Web applications that rely on XML as a data-exchange format dictates the need for tools that can efficiently collect data from multiple distributed XML sources and incorporate same in a target XML document. In practice, such XML integration is typically DTD-directed. That is, the integration task is constrained by a predefined Document Type Definition (DTD) that the target XML document is required to conform. DTD-conformance is evident when, for example, enterprises agree on a common DTD and then exchange and interpret their XML data based on this predefined DTD. Another important application of DTD-conformance concerns security. That is, the integrated XML document, as a view of the original data, is required to conform to a pre-specified "view DTD" in order to both hide confidential information and facilitate effective formulation of user queries over the secure integrated view.

Ensuring the conformance of an integrated XML document (created through multiple XML data sources) to a predefined target DTD is a non-trivial problem. First, the target DTD itself may specify a fairly complex schema structure, e.g., recursive and/or non-deterministic with disjunctions. Second, the integration task may be large-scale and naturally "hierarchical". In other words, the integration may involve a large number of distributed data sources, where some of the sources are virtual, in the sense that they are views that need to be created via XML integration. This latter requirement indicates that effective XML-integration specifications should be composable, such that large, complex integration tasks can be built via composition of simpler sub-tasks.

A straightforward solution to DTD-directed XML data integration employs a well-known XML query language (e.g., XQuery, XSLT) to define an integrated XML view, and then check whether the resulting view conforms to the prescribed DTD. Unfortunately, such an approach fails for a number of reasons. First, using full XML query languages to define an integrated view cannot guarantee DTD-conformance. Specifically, type inference for such derived XML views is too expensive to be used in practice. That is, it is intractable for extremely restricted view definitions, and undecidable for realistic views. Similarly, accurate XML type checking is difficult. Accordingly, languages such as XQuery typically implement only approximate type checking. Such an approach provides no guidance on how to specify a DTD-conforming XML view. This means that DTD-directed integration becomes a trial-and-error process where, if a resulting view fails to type-check, the view definition needs to be modified and the type-checking process must be repeated. For complex integration mappings, reaching a DTD-conforming integrated view through repeated trial-and-error is a time consuming and arduous process. Second, while Turing-Complete XML query languages (such as XQuery) can express very complex integration mappings, optimization for such languages still remains to be explored, and their complexity makes it desirable to work within a more limited formalism. That is, when it comes to large scale XML data integration, it is often desirable to trade expressive power for efficiency and ease-of-use.

Attribute Integration Grammars (AIGs), a grammar-based formalism for schema-directed integration of relational data in XML, are another possible solution. AIGs extend a target DTD with tuple-valued attributes and SQL queries over the relations, whereas a mild variation of AIGs can support DTD-directed XML-to-XML transformations. However, these proposals are inadequate for XML integration because they are restricted to flat, relational sources and they are not composable. Developing an effective, modular solution for large-scale, DTD-directed XML data integration poses a new set of challenges including the need for a significantly more powerful, composable formalism technique. Accordingly, there is a need for language construction rules or grammars that collect XML data from various sources and cost effectively and correctly integrate such data into a single XML document that conforms to a desired target DTD.

SUMMARY OF THE INVENTION

The disadvantages associated with the prior art are overcome by the present invention of a grammar for mapping a first grouping of XML data having at least one parent element and a set of corresponding child elements into a second grouping of XML data and a method for accomplishing same to incorporate the first grouping of XML data into the second grouping of XML data. In an embodiment of the invention, the grammar includes a first rule for computing a first child element attribute by extracting data from one or more sources via a query which takes a first parent element attribute as a constant; and a second rule for computing a second parent element attribute by grouping one or more second child element attributes. The first rule and second rule vary according to a production of an element type of the first grouping of XML data that is being evaluated. The element types capable of being evaluated include PCDATA, disjunctive, conjunctive and Kleene star, each having a unique rule set for defining inherited and synthesized attributes of the parent and child elements.

Additionally, the method for performing the integration (thereby specifying Document Type Definition (DTD) integration of XML data) includes the step of executing a mapping of a first grouping of XML data having at least one parent element and a set of corresponding child elements into a second grouping of XML data. The mapping further includes following at least one rule for computing a first child element attribute and a second parent element according to a production type of the XML data. The production types being selected from those identified above with respect to the grammar of the subject invention.

BRIEF DESCRIPTION OF THE DRAWINGS

The teachings of the present invention can be readily understood by considering the following detailed description in conjunction with the accompanying drawings, in which:

FIG. 3 depicts an XML Integration Grammar (XIG) in accordance with the subject invention.

DETAILED DESCRIPTION

Figure 1:
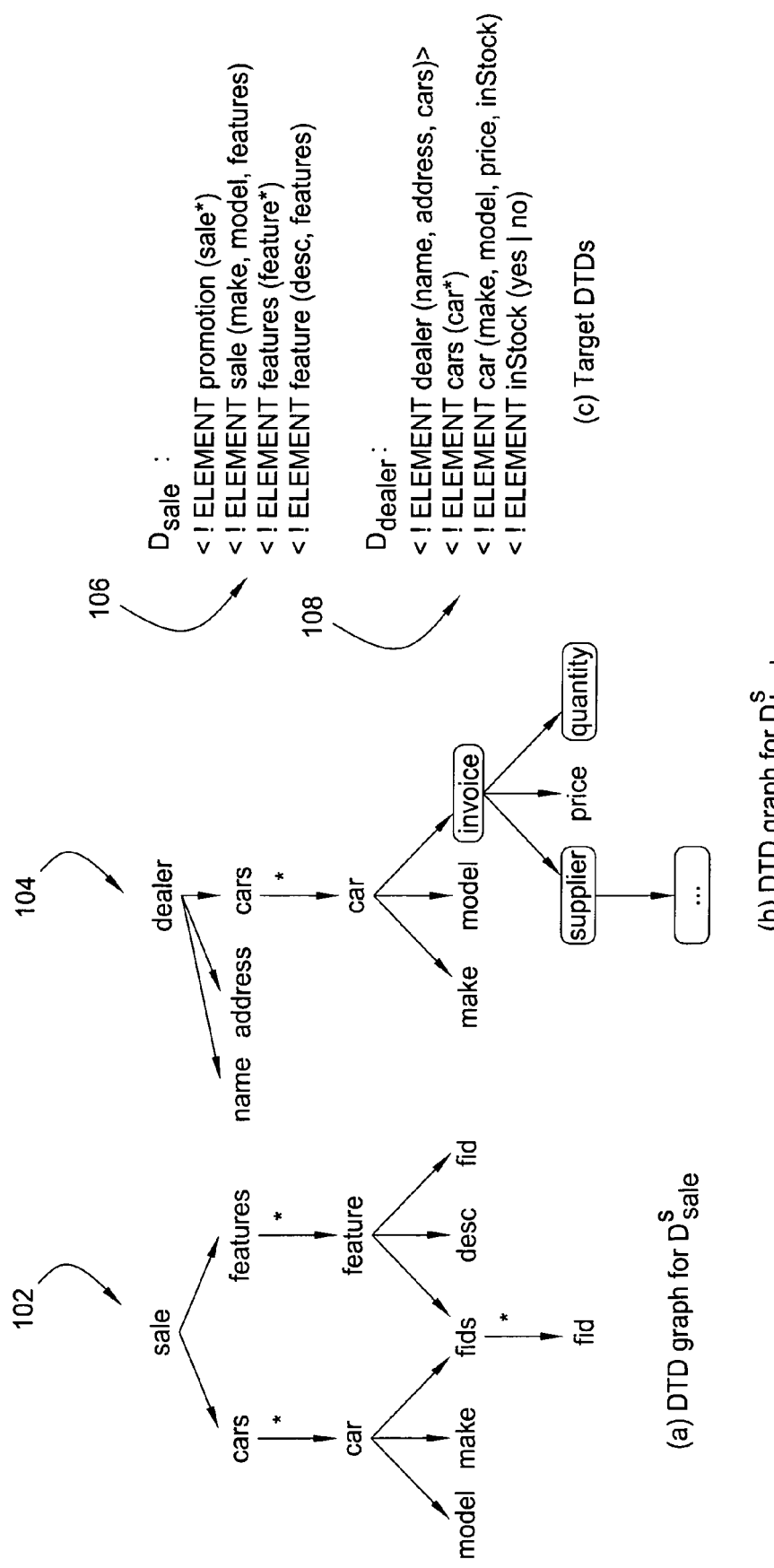
FIG. 1 depicts source and target Document Type Definitions of XML data to be processed in accordance with one example of the subject invention.

The inventors provide a novel formalism, denoted as XML Integration Grammars (XIGs), for a modular specification of complex, DTD-directed XML integration tasks. The invention is described within the context of specific functions and processes. However, it will be appreciated that the teachings of the invention are adaptable to many other functions and processes. An XIG is a (partial) function defined with a target DTD D, a fragment of a query language (such as XQuery), and tree-valued attributes that, given a collection of XML data sources, constructs an integrated XML document that conforms to D. The definition of an XIG is built on top of the individual element productions in the target DTD D using a collection of localized semantic rules. These rules for a DTD element production are used to compute intermediate results in tree-valued attributes that correspond to the appropriate data elements in the integrated XML document, and include (1) queries over the XML sources expressed in the XQuery fragment used, and (2) embedded XIG calls which can be either local (i.e., executed at the same site) or remote (i.e., executed remotely).

An XIG call is essentially treated as a "black box" that returns an XML tree conforming to its target DTD, thus allowing for modular XIG specifications of complex integration tasks. Based on this XIG formalism, a middleware-system architecture for DTD-directed XML integration and novel techniques for optimizing the evaluation of XIGs is proposed. Taking a middleware-based approach to XIG evaluation, results in several effective XIG-specific optimization techniques that can be applied outside the generic XQuery engine. More specifically, it is possible to capture recursive DTDs and recursive XIGs in a uniform framework, and propose a cost-based algorithm for scheduling local XML queries/XIGs and remote XIGs to maximize parallelism. An algorithm for merging multiple XQuery expressions into a single query without using "outer-union/outerjoin" is also proposed. Combined with possible optimization techniques for the XQuery fragment used in XIG definitions, such optimizations can yield efficient evaluation strategies for DTD-directed XML integration.

Note that XIG formalism is not an XML transformation language. XIGs serve as a user/application level interface for specifying DTD-directed integration in query languages. Being built around the productions in the target DTD, XIGs provide guidance on how to specify XML integration in a manner that automatically guarantees DTD conformance. Furthermore, XIGs rely on semantic rules that are local to each DTD production, thereby allowing integration sub-tasks to be declaratively specified for each production in isolation. Such a feature allows XIGs to simplify a complex integration task by breaking it into small, production/element-specific pieces that can be specified independently. XIG definitions rely solely on DTDs and a query language. As such, there is no need to study any new, specialized integration language. XIGs can be compiled into, for example, XQuery functions that impose control over computation and data flow of queries to automatically ensure DTD-conformance. Moreover, XIGs can be defined using some specific XQuery fragment that allows for more optimizations than full-fledged XQuery, thus providing better performance. Other types of query languages known to those skilled in the art can also be used to achieve the desired results and are within the scope of this invention.

Figure 2:
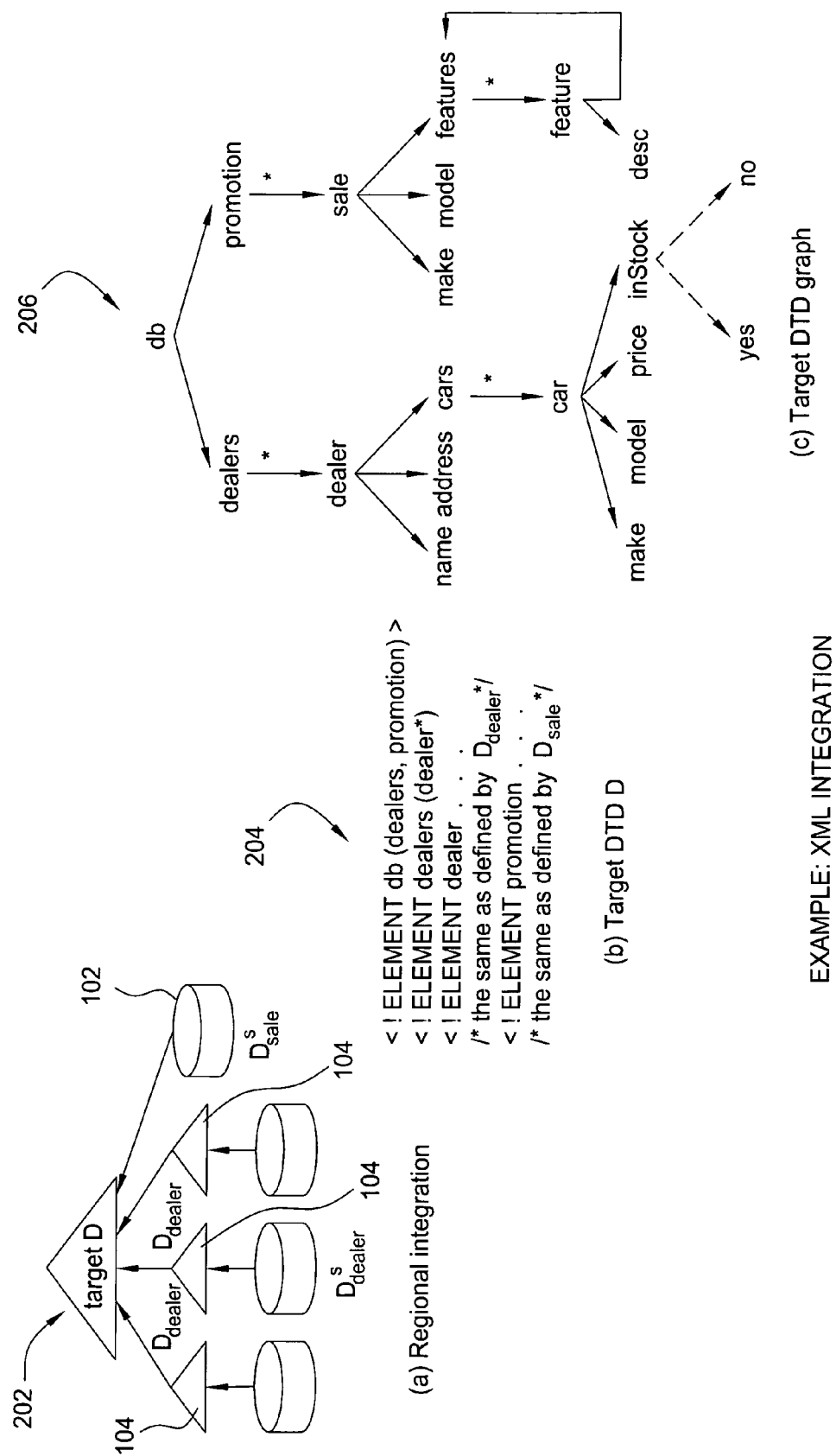
FIG. 2 depicts source and target Document Type Definitions of integrated XML data of one example of the subject invention.

A brief review of DTDs and XQuery expressions is useful in describing the subject invention. Without loss of generality, a DTD is defined as (Ele, P, r), where Ele is a finite set of element types; r is a distinguished type in Ele, called the root type; P defines the element types: for each A in Ele, P(A) is a regular expression of the following form:

$$\alpha ::= \text{PCDATA} | \epsilon | B_1, \ldots, B_n | B_1 + \ldots + B_n | B^*$$

where $\epsilon$ is the empty word, B is a type in Ele (referred to as a child type of A), and '+', ',' and '*' denote disjunction, concatenation and the Kleene star, respectively. $A \rightarrow P(A)$ is referred to as the production of A. It has been shown that all DTDs can be converted to this form in linear time by introducing new element types. Examples of DTDs can be found in FIGS. 1 and 2. Consider the XML-to-XML transformation of promotional data for a car sale. The source data is specified by the DTD Dsale 102 depicted in FIG. 1(a), in which '*' indicates one or more occurrences. It consists of cars promoted and their features. Each feature is identified by a fid, a key of the feature, and may be composed of other features. To exchange the data, one wants to convert the source data to a target document conforming to the DTD Dsale 106 given in FIG. 1(c). The target DTD 106 groups features under each car for sale, along with the composition hierarchy of each feature. Observe that the target DTD is recursive: the element type features is indirectly defined in terms of itself.

As another example, consider a view for car dealers. Each dealer maintains a local XML document specified by a source DTD $D_{dealer}$ 104 which describes the dealer, cars carried by the dealer, and invoice, as depicted in FIG. 1(b). Some information is confidential, such as invoice and quantity, as indicated by the shadowed nodes in FIG. 1(b), which should not be made public. To hide the confidential data, one wants to define a view for each dealer such that the dealer data can only be accessed through the view. As a user interface the dealers want to provide the view DTD $D_{dealer}$ 108 given in FIG. 1(c) and requires the views to conform to $D_{dealer}$ 104.

Also consider integration of XML data for car dealers in a region together with sale promotion data. The regional integration is to extract data from XML sources and construct a single target document that consists of sale data, information of all the dealers in the region, and cars carried by these dealers and promoted by sale. As shown in FIG. 2(a), the XML sources include (1) a sale document conforming to DTD $D_{sale}$ 102 and (2) dealer views conforming to DTD $D_{dealer}$ 104. The target document 202 is required to conform to the DTD D 204 given in FIG. 2(b). Specifically, the integration is to transform the sale source data to and collect dealer information from the views; for each dealer, it only gathers data for cars that are promoted by sale.

This integration task is rather complex. First, the target DTD 204 is recursive and non-deterministic; its DTD graph 206 given in FIG. 2(c) is cyclic and contains dashed edges (used to denote disjunction to distinguish from solid edges for concatenation). Second, the integration is "hierarchical". That is, it involves a number of XML views distributed across the dealers' sites, which are in turn the result of transformation from local documents conforming to $D_{dealer}$.

An XML document (tree) T conforms to a DTD D if (1) there is a unique node, the root, in T labeled with r; (2) each node in T is labeled either with an Ele type A, called an A element, or with PCDATA, called a text node; (3) each A element has a list of children of elements and text nodes such that their labels are in the regular language defined by P(A); and, (4) each text node carries a string value (PCDATA) and is a leaf of the tree. T is referred to as a document (instance) of D if T conforms to D.

XIGs can be defined with any fragment of XQuery that supports FLWR constructs as discussed in XQuery 1.0: An XML Query Language, by D. Chamberlin et al., W3C Working Draft, June 2001, herein incorporated by reference, and permits effective optimization. Given a fragment of XQuery, the syntax is extended by incorporating XIG calls in the top level let clauses. Specifically, consider the class of queries defined as follows:

$$Q::=q \mid \text{let} \$_\chi:=\text{XIG\_call} \, Q \; \text{XIG\_call}::=U_V{:}V(U)\mid V(U)$$

where q is a query in the fragment, V is an XIG, $U_V$ is the URI of V (for remote XIG), and U is the URI of a source XML document. Here $U_V{:}V(U)$ denotes a remote XIG call, and $V(U)$ is a local XIG call. The semantics of a query "let$_\chi$:=XIG_call Q" is to first evaluate the XIG, assign the result of the evaluation to $x as a constant, and then evaluate the XQuery expression q. This extension is referred to as $XQ^e$. An XIG is defined with a target DTD D and is evaluated to an XML document of D; thus, the XIG can be viewed as an XML expression of "type" D.

An XIG V is a partial function from a collection X of XML sources to documents of a target DTD D, referred to as an XIG from X to D and denoted by $V{:}X \rightarrow D$. Specifically, let D=(Ele, P, r); then V is defined on top of D as follows.

Attributes: For each element type A in Ele, V defines an inherited attribute Inh(A) and a synthesized attribute Syn(A); the values of these attributes are a single XML element. Intuitively, inherited attributes are to pass data and control, and synthesized attributes are to hold partial results (subtrees).

Rules: For each production p=A$\rightarrow\alpha$ in P, V defines a set rule (p) of semantic rules consisting of:
 for each child type B in $\alpha$, a rule for computing Inh(B) by extracting data from sources via an $XQ^e$ query, which may take the parent Inh(A) as a parameter;
 for the parent type A, a rule Syn(A) by grouping together Syn(B) for children B in $\alpha$.

Input/Output: The sources X is called the input of V, the value of the synthesized attribute Syn(r) of the root is the output of V, and D is the type of V.

Given an input X, V(X) returns Syn(r), which is an XML document conforming to the target DTD D.

FIG. 3 depicts an XIG 300 in accordance with the subject invention. The XIG 300 defines a view for local dealers: given the URI U of a local document specified by the DTD $D^s_{dealer}$ of FIG. 1(b), $V_{dealer}(U)$ returns an XML document conforming to $D_{dealer}$ of FIG. 1(c). Thus $V_{dealer}$ can be treated as a function: $D^s_{dealer} \rightarrow D_{dealer}$. The XIG 300 is defined on top of the view DTD $D_{dealer}$ with $XQ^e$ queries and tree attribution. For each element type A in $D_{dealer}$, it defines two attributes Inh(A) and Syn(A), which contain a single XML element as their value. For each production of $D_{dealer}$, it defines a set of rules via $XQ^e$ to compute the inherited attributes of the children, using the inherited attribute of the parent as a parameter. In addition, there is a single rule for computing the synthesized attribute of the parent, by collecting the synthesized attributes of its children.

For a production p=A$\rightarrow\alpha$, the semantic rules rule(p) enforce that Syn(A) is indeed an A element as follows.

P=A$\rightarrow$PCDATA. Then rule(p) is defined as
Syn(A)={Q(Inh(A))/value( )},

Where Q is an $XQ^e$ query that returns PCDATA and treats Inh(A) as a constant parameter. See, e.g., the rule for production name$\rightarrow$PCDATA in the XIG $V_{dealer}$ of FIG. 3.

P=A$\rightarrow B_1, \ldots, B_n$. Then rule(p) consists of $$Inh(B_i)=Q_i(Inh(A))/*\text{for } i\epsilon[1,n]*/, Syn(A)=<A>\{Syn(B_1)\ldots Syn(B_n)\}</A>,$$

Where for each i$\epsilon$[1,n], $Q_i$ is an $XQ^e$ query that returns a single element (subtree). As an example, see the rules for car$\rightarrow$make, model, price, inStock in $V_{dealer}$.

P=A$\rightarrow B_1 + \ldots + B_n$. Then rule(p) is defined as:

$$Inh(B_i)=\text{let } \$c:=Q_c(Inh(A)) \text{ return } \{\text{if } C_i(\$c) \text{ then } Q_i(Inh(A)) \text{ else}<\text{empty}/>\}/*\text{for } i\epsilon[1,n]*/,$$

$$Syn(A)=\text{let } \$c:=Q_c(Inh(A)) \text{ return}$$

$$\{\text{if } C_1(\$c) \text{ then } <A>Syn(B_1)</A> \text{ else} \ldots \text{else if } C_n(\$c) \text{ then } <A>Syn(B_n)</A> \text{ else}<\text{empty}/>\}$$

where $Q_c$ is an $XQ^e$ query, referred to as the condition query of rule(p), which is evaluated only once for all the rules in rule(p); $Q_i$ is an $XQ^e$ query that returns a single element; and, $C_i$ is a Boolean $XQ^e$ expression exclusive to each other: one and only one $C_i$ is true for all i$\epsilon$[1,n]. For example, see the rules for the production inStock$\rightarrow$yes+no in $V_{dealer}$.

P=A$\rightarrow$B*. Then rule(p) is defined as:

$$Inh(B) \leftarrow \text{for } \$b \text{ in } Q(Inh(A)) \text{ where } C(\$b) \text{ return } \$b, Syn(A)=<A>\sqcup_i Syn(B)</A>,$$

where Q is an $XQ^e$ query that may return a (probably empty) set of elements, C is an $XQ^e$ Boolean expression, and "$\sqcup_i$" is a list constructor. For each $b generated by Q, the rules for processing B are evaluated, treating $b as a value of Inh(B). Then the rule for Syn(A) groups together the corresponding Syn(B)'s into a list using $\sqcup_i$ in the same order as the one when the $b's are generated. For example, see the rules for cars$\rightarrow$car* in $V_{dealer}$.

P=A$\rightarrow\epsilon$. Then rule(p) is defined by
Syn(A)=Q(Inh(A))
where Q is an $XQ^e$ query such that Q(Inh(A)) returns either <A/>, or <empty/> if the value of Syn(A) is not to be included in the target document. For example, see the rule for the production yes$\rightarrow\epsilon$ in $V_{dealer}$.

Several subtleties are worth mentioning. First, recall that Syn(A) is defined in terms of Syn(Bi). In the rule for computing Syn(A) one may replace Syn($B_i$) with the $XQ^e$ query for computing Syn($B_i$)(defined in the rules for $B_i$). For example, in the XIG $V_{dealer}$, the rules for dealer and car can be rewritten as:

Dealer$\rightarrow$name, address, cars
Inh(cars)={U/dealer/cars};
Syn(dealer)=<dealer> {U/dealer/name} {U/dealer/addr} {Syn(cars)}</dealer>
Car$\rightarrow$make, model, price, inStock
Inh(inStock)={Inh(car)};
Syn(car)=<car>{Inh(car)/model} {Inh(car)/make} {Inh(car)/invoice/price} {Syn(inStock)}</car>

These substitutions can avoid unnecessary computation of inherited attributes that are not needed elsewhere. Second, XML constraints are ignored, but the definition of XIGs can be easily extended to incorporate constraints as discussed for example in Capturing both Types and Constraints in Data Integration by Benedikt et al., SIGMOD, 2003 to ensure both DTD-conformance and constraint satisfaction in XML integration. Third, as XIGs support tree attribution and return XML trees, semantic attributes can be computed via other XIGs. Furthermore, as embedded XIGs ensure conformance to their target DTDs, one can use them as expressions without complicating the typing analyses, thus making XIGs composable.

The operational semantics of an XIG (i.e., V: X$\rightarrow$D as presented above) are now considered. Given an instance of X, V evaluates its attributes via its rules and returns Syn(r) of the root r of D as its output. The evaluation is carried out in a top-down manner, using a stack. The root r is first pushed onto the stack. For each node A at the top of the stack, a subtree Syn(A) is computed. This is accomplished by first identifying the production p=A→α in D, and for each B in α, Inh(B) is evaluated with rule(p) as follows:

p=A→PCDATA—First, Q(Inh(A)) is evaluated, treating Inh(A) as a constant. Note that if Q has an embedded XIG, the XIG is invoked and evaluated. Then, the PCDATA of Q(Inh(A)) is assigned to Syn(A).

p=A→$B_1, \ldots, B_n$—For each Bi, Inh($B_i$) is computed by evaluating $Q_i$(Inh(A)). Then, Bi is pushed onto the stack and each is processed in the same way using the value of Inh($B_i$). After all of the $B_i$'s are evaluated and popped off of the stack, i.e., when all the Syn($B_i$)'s are available, Syn(A) is computed by collecting all of the Syn($B_i$)'s such that A has a unique $B_i$ child for each i∈[1,n].

p=A→$B_1$+ . . . +$B_n$—First, the condition query $Q_c$(Inh(A)) is evaluated and the first $B_i$ is selected such that its corresponding $C_i$ is true with respect to the result of $Q_c$. Next, the rule for computing Inh($B_i$) is evaluated. This $B_i$ is pushed onto the stack and is processed inductively using the value of Inh($B_i$). After this Bi is popped off of the stack and Syn($B_i$) is available, Syn(A) is computed by means of Syn($B_i$). Note that Inh($B_j$) and Syn($B_j$) are not computed if j≠i, i.e., Bi is the only child of A.

P=A→B*—First, Q(Inh(A)) is evaluated in the rule for computing Inh(B) For each $c returned by Q, a copy of B is pushed onto the stack, taking $c as its inherited value. The B nodes are then processed in the same way. After these nodes have been evaluated and popped off of the stack, Syn(A) is assigned the list consisting of all the Syn(B)'s. Note that is Q is empty, then Syn(A) is <empty/>, i.e., A has no children.

p=A→ε—Q(Inh(A)) is evaluated and its result is treated as Syn(A). After Syn(A) is computed, A is popped off of the stack and Syn(A) is used to evaluate other nodes until no more nodes are in the stack. At this stage, Syn(r) is computed and returned as the output of the XIG evaluation. Note that for each A, its inherited attribute is evaluated first, then its synthesized attribute, which is an A-subtree. The evaluation takes one-sweep. That is, each A element is visited twice, first pushed onto the stack and then popped off after its subtree is constructed. Accordingly, such an XIG is capable of taking XML from various sources and integrating same into a single target DTD.

Although various embodiments which incorporate the teachings of the present invention have been shown and described in detail herein, those skilled in the art can readily devise many other varied embodiments that still incorporate these teachings.

What is claimed is:

1. A method for providing an XML integration grammar (XG) for mapping multiple XML sources into a single XML target, the method comprising:

for each production based on a Document Type Definition (DTD) of the target, the production being associated with a parent type, automatically defining a set of rules, the defining comprising:

for each child type of the production, defining a first rule for computing an inherited attribute for the child type by extracting data, via a query, from one or more DTDs corresponding to the multiple XML sources, the query being adapted to take an inherited attribute defined for the parent type as a query parameter; and for the parent type, defining a second rule for computing a synthesized attribute for the parent type by grouping synthesized attributes for all child types of the production; and storing the XIG, wherein the XIG comprises defined sets of rules.

2. The method of claim 1, wherein a value of the synthesized attribute for a root node of the target DTD is an XML document conforming to the target DTD.

3. The method of claim 1, wherein, when the production is p=A→PCDATA, the second rule is defined as $Syn(A)=\{Q(Inh(A))/\text{value}(\ )\}$, where:
Inh (A) is the inherited attribute for the parent type A,
Syn (A) is the synthesized attribute for the parent type A, and
Q is an $XQ^e$ query that returns PCDATA and uses Inh (A) as a constant.

4. The method of claim 1 wherein, when the production is p=A→$B_1, \ldots, B_n$, the first rule is defined as $Inh(B_i)=Q_i(Inh(A))$, for each i∈[1,n]

and the second rule is defined as $Syn(A)=<A>\{Syn(B_1) \ldots Syn(B_n)\}</A>$ where:
Inh (A) is the inherited attribute for the parent type A,
Syn (A) is the synthesized attribute for the parent type A,
Inh (B) is the inherited attribute for the child type B,
Syn (B) is the synthesized attribute for the child type B, and
for each i∈[1, n], $Q_i$ is an $XQ^e$ query that returns a single element (subtree).

5. The method of claim 1, wherein, when the production is p=→$B_1$+ . . . +$B_n$, the first rule is defined as $Inh(B_i)$=let $c:=$Q_c(Inh(A))$ return \{if $C_i$($c) then $Q_i(Inh(A))$ else <empty/>\}, for each i∈[1,n], and the second rule is defined as $Syn(A)$=let $c:=$Q_c(Inh(A))$ return \{if $C_1$($c) then $<A>Syn(B_1)</A>$ else . . .

else if $C_n$($c) then $<A>Syn(B_n)</A>$ else <empty/>\}, where:
Inh (A) is the inherited attribute for the parent type A,
Syn (A) is the synthesized attribute for the parent type A,
Inh (B) is the inherited attribute for the child type B,
Syn (B) is the synthesized attribute for the child type B,
$Q_c$ is an $XQ^e$ query, referred to as the condition query of the set of rules, which is evaluated only once for all the rules in the set of rules,
$Q_i$ is an $XQ^e$ query that returns a single element, and
$C_i$ is a Boolean mutually exclusive Boolean $XQ^e$ expression, such that for all i∈[1, n],: one and only one $C_i$ is true.

6. The method of claim 1, wherein, when the production is p=A→B*, the first rule is defined as:

$Inh(B)$←for $b in $Q(Inh(A))$ where $C($b) returns $b, and the second rule is defined as:

$Syn(A)=<A>\sqcup Syn(B)</A>$, where:
Inh (A) is the inherited attribute for the parent type A,
Syn (A) is the synthesized attribute for the parent type A,
Inh (B) is the inherited attribute for the child type B,
Syn (B) is the synthesized attribute for the child type B,
Q is an $XQ^e$ query that may return an empty set of element,
C is an $XQ^e$ Boolean expression, and
⊔ is a list constructor.

7. The method of claim 1, wherein, when the production is $p=A\rightarrow\sqcup$, the second rule is defined by $$Syn(A)=Q(Inh(A)),$$

where:
- Inh (A) is the inherited attribute for the parent type A,
- Syn (A) is the synthesized attribute for the parent type A, and
- Q is an $XQ^e$ query such that Q (Inh (A)) returns a value selected from the group consisting of <A/> and <empty/> if the value of Syn (A) is not to be included in the target.

8. The method of claim 1, wherein the one or more DTDs includes at least two different DTDs.

9. The method of claim 1, wherein the inherited attribute for the child type and the synthesized attribute for the parent type are computed according to a type of the production.

10. A method for integrating data from one or more XML sources into a single target, the method comprising:
- applying an XML integration grammar (XIG) to the one or more sources to determine the target, wherein the XIG is generated automatically, the XIG comprising:
  - a set of rules for each production based on a Document Type Definition (DTD) of the target, wherein the production is associated with a parent type and a set of child types, the set of rules comprising:
    - for each child type in the set of child types, a first rule for computing an inherited attribute for the child type by extracting data, via a query, from one or more DTDs corresponding to the one or more XML sources, the query having a query parameter comprising an inherited attribute for the parent type; and
    - for the parent type, a second rule for computing a synthesized attribute for the parent type by grouping synthesized attributes for all child types of the set in the child types; and
- storing the target.

11. The method of claim 10, wherein the inherited attribute for the child type and the synthesized attribute for the parent type are computed according to a type of the production.

12. The method of claim 11, wherein, when the production is $p=A\rightarrow PCDATA$, the second rule is defined as $$Syn(A)=\{Q(Inh(A))/\text{value}(\,)\},$$

where:
- Inh (A) is the inherited attribute for the parent type A,
- Syn (A) is the synthesized attribute for the parent type A, and
- Q is an $XQ^e$ query that returns PCDATA and uses Inh (A) as a constant.

13. The method of claim 11 wherein, when the production is $p=A\rightarrow B_1, \ldots, B_n$, the first rule is defined as $$Inh(B_i)=Q_i(Inh(A)), \text{ for each } i \in [1,n]$$

and the second rule is defined as $$Syn(A)=<A>\{Syn(B_1)\ldots Syn(B_n)\}</A>$$

where:
- Inh (A) is the inherited attribute for the parent type A,
- Syn (A) is the synthesized attribute for the parent type A,
- Inh (B) is the inherited attribute for the child type A,
- Syn (B) is the synthesized attribute for the child type A, and
- for each $i \in [1, n]$, Q is an $XQ^e$ query that returns a single element (subtree).

14. The method of claim 11, wherein, when the production is $p=A\rightarrow B_1 + \ldots + B_n$, the first rule is defined as $$Inh(B_i)=\text{let } \$c:=Q_c(Inh(A)) \text{ return } \{\text{if } C_i(\$c) \text{ then } Q_i(Inh(A))$$

$$\text{else } <\text{empty}/>\}, \text{ for each } i \in [1,n],$$

and the second rule is defined as $$Syn(A)=\text{let } \$c:=Q_c(Inh(A)) \text{ return}$$

$$\{\text{if } C_1(\$c) \text{ then } <A>Syn(B_1)</A> \text{ else } \ldots$$

$$\text{else if } C_n(\$c) \text{ then } <A>Syn(B_n)</A> \text{ else } <\text{empty}/>\},$$

where:
- Inh (A) is the inherited attribute for the parent type A,
- Syn (A) is the synthesized attribute for the parent type A,
- Inh (B) is the inherited attribute for the child type B,
- Syn (B) is the synthesized attribute for the child type B,
- $Q_c$ is an $XQ^e$ query, referred to as the condition query of the set of rules which is evaluated only once for all the rules in the set of rules,
- $Q_i$ is an $XQ^e$ query that returns a single element, and
- $C_i$ is a Boolean mutually exclusive Boolean $XQ^e$ expression, such that for all $i \in [1, n]$,: one and only one $C_i$ is true.

15. The method of claim 11, wherein, when the production is $p=A\rightarrow B^*$, the first rule is defined as:

$$Inh(B)\leftarrow \text{for } \$b \text{ in } Q(Inh(A)) \text{ where } C(\$b) \text{ returns } \$b,$$

and the second rule is defined as:

$$Syn(A)=<A>\sqcup Syn(B)</A>,$$

where:
- Inh (A) is the inherited attribute for the parent type A,
- Syn (A) is the synthesized attribute for the parent type A,
- Inh (B) is the inherited attribute for the child type B,
- Syn (B) is the synthesized attribute for the child type B,
- Q is an $XQ^e$ query that may return an empty set of element,
- C is an $XQ^e$ Boolean expression, and
- $\sqcup$ is a list constructor.

16. The method of claim 11, wherein, when the production associated with the parent is $p=A\rightarrow\sqcup$, the second rule is defined by $$Syn(A)=Q(Inh(A)),$$

where:
- Inh (A) is the inherited attribute for the parent type A,
- Syn (A) is the synthesized attribute for the parent type A, and
- Q is an $XQ^e$ query such that Q (Inh (A)) returns a value selected from the group consisting of <A/> and <empty/> if the value of Syn (A) is not to be included in the target.

17. The method of claim 10, wherein the target is determined by computing a value of the synthesized attribute for a root node of the target DTD.

18. The method of claim 17, wherein the computed value is an XML document conforming to the target DTD.

19. The method of claim 10, wherein the one or more DTDs includes at least two different DTDs.

20. The method of claim 10, wherein inherited attributes pass one or more data parameters and wherein synthesized attributes hold at least partial results.

* * * * *